United States Patent [19]

Kako

[11] Patent Number: 5,069,182
[45] Date of Patent: Dec. 3, 1991

[54] IGNITION TIMING CONTROL APPARATUS FOR AN ENGINE

[75] Inventor: Hajime Kako, Himeji, Japan

[73] Assignee: Mitsubishi Denki Kabushiki Kaisha, Tokyo, Japan

[21] Appl. No.: 520,948

[22] Filed: May 9, 1990

[30] Foreign Application Priority Data

May 22, 1989 [JP] Japan .................................. 1-129258
May 22, 1989 [JP] Japan .................................. 1-129259

[51] Int. Cl.⁵ .......................... F02P 5/00; F02D 5/00
[52] U.S. Cl. .................................... 123/418; 123/478
[58] Field of Search .............. 123/418, 339, 478; 324/391

[56] References Cited

U.S. PATENT DOCUMENTS 4,338,899  7/1982  Geiger et al. ........................ 123/339
4,506,639  3/1985  Murakami et al. .................. 123/339
4,732,125  3/1988  Takizawa ............................ 123/339
4,884,540  12/1989  Kishimoto et al. ................. 123/418

FOREIGN PATENT DOCUMENTS 3630907  4/1988  Fed. Rep. of Germany .
0063326  4/1984  Japan ................................... 123/339
14192  3/1988  Japan .

Primary Examiner—E. Rollins Cross
Assistant Examiner—Robert E. Mates
Attorney, Agent, or Firm—Sughrue, Mion, Zinn, Macpeak and Seas

[57] ABSTRACT

A control apparatus for an engine comprises an air-fuel ratio sensor for detecting an air-fuel ratio on the basis of an exhaust gas component from the engine, a fuel controller which receives an output from the air-fuel sensor so as to feed-back-control a fuel quantity in response to the operating conditions of the engine so that the air-fuel ratio becomes optimum, a fuel supplier to supply fuel on the basis of a signal from the fuel controller, and a target advance angle value changer which selects a fixed advance angle value for ignition timing independent from the operating conditions of the engine when an instruction signal for adjusting the ignition timing is generated from an ignition timing adjustment signal generator, an ignition device which effects ignition in accordance with an output from the target advance angle value changer, and a feed-back control stopping device which stops the feed-back control of the air-fuel ratio when the instruction signal is generated from the ignition timing adjustment signal generator.

1 Claim, 11 Drawing Sheets

IGNITION TIMING CONTROL APPARATUS FOR AN ENGINE

BACKGROUND OF THE INVENTION

1. FIELD OF THE INVENTION

The present invention relates to a control apparatus for an internal combustion engine which controls a fuel quantity to be supplied to the engine and the timing of the ignition. More particularly, it relates to how to control an engine at the time of adjusting ignition timing.

2. DISCUSSION OF BACKGROUND

FIG. 12 is a block diagram showing a construction of a conventional control apparatus for an engine. In FIG. 12, a reference numeral 1 designates a reference angle sensor which outputs a reference angle signal SG by detecting a predetermined angle before the top dead center point of the crank angle, e.g. an angle of BTDC 75°, of the engine, a numeral 2 designates an intake air pipe pressure sensor to detect a pressure in an intake air pipe in the engine, a numeral 3 designates an ignition timing adjustment signal generator which is constituted by, for instance, a switch whose one terminal is grounded and which is so operated that it is turned on at the time of adjusting the timing of ignition so that a ground potential signal is generated, a numeral 4 designates an idle switch which is turned on when it detects an idling position of a throttle valve in the intake air pipe of the engine, a numeral 5 designates an $O_2$ sensor which detects a concentration of oxygen in the exhaust gas, a numeral 6 designates a base advance angle value operating means which calculates a base advance angle value of ignition timing on the basis of an engine revolution number and an intake air pipe pressure, a numeral 7 designates a correction means for stabilizing idling which corrects the base advance angle value so as to eliminate the difference between an actual revolution number and an average revolution number at the time of idling operations, a numeral 8 designates a target advance angle value changing means which selects either a fixed advance angle value or a target advance angle value from the correction means for stabilizing idling 7 in accordance with a signal from the ignition timing adjustment signal generator 3 and generates an output in accordance with the selection, a numeral 9 designates an advance angle-time converting means which converts the selected target advance angle value into a time, a numeral 10 designates an ignition signal output means which outputs an ignition signal IGT immediately after a period of time converted by the converting means 9 has passed, on the basis of the reference angle signal SG, a numeral 11 designates an ignition device comprising an igniter, an ignition coil, a distributor, an ignition plug and so on, which effects ON/OFF control of a primary current of the ignition coil in response to the ignition signal IGT applied thereto, a numeral 12 designates a base fuel quantity operating means which operates a base fuel quantity on the basis of an engine revolution number and an intake air pipe pressure, a numeral 13 designates a feed-back correction means which corrects the calculated base fuel quantity upon the receipt of an output from the $O_2$ sensor 5, a numeral 15 designates a fuel injection signal output means which converts a fuel quantity into a time for driving a fuel injection valve so that a fuel injection valve 16 is actuated in synchronism with the reference angle signal SG during the time determined by the fuel injection signal output means, and a numeral 17A designates an electronic control unit which is constituted by the above-mentioned structural elements 6–10, 12, 13 and 15 and which generates the above-mentioned ignition signal IGT, fuel injection signal and so on.

The operation of the conventional control apparatus will be described.

The reference angle sensor 1 for detecting a crank angle position of the engine outputs a reference angle signal SG which rises at a crank angle of BDTC 75° and falls at a crank angle of BTDC 5°.

The base fuel quantity operating means 12 calculates a base fuel quantity by mapping a two-dimensional map which is prepared on the basis of an actual revolution number signal Ne which represents an actual revolution number of the engine which is obtained based on the reference angle signal SG, and a pressure signal Pb which represents an inner pressure of the intake air pipe which is detected by the intake air pipe pressure sensor 2.

The output $V_{O2}$ of the $O_2$ sensor 5 is such as shown in FIG. 5, namely, when the air-fuel ratio exceeds a value of 14.7, the output is at a lean value which is less threshold voltage $V_{th}$, and when the air-fuel ratio is less than 14.7, the output is at a rich value which exceeds $V_{th}$.

The feed-back correction means 13 receives the output voltage $V_{O2}$ of the $O_2$ sensor 5; and treats the output voltage $V_{O2}$ with proportion and integration processes to thereby obtain a feed-back correction coefficient $K_{FB}$ (FIG. 6). Then, the correction means 13 outputs a signal indicating a fuel quantity by multiplying the base fuel quantity obtained by the base fuel quantity operating means 12 by the coefficient $K_{FB}$.

The fuel injection signal output means 15 converts the fuel quantity into a time for driving a fuel injection valve and outputs a fuel injection signal having a time width corresponding to the time for driving the fuel injection valve in synchronism with the rising of the reference angle signal SG, so-that the fuel injection valve 16 is actuated. Thus, fuel is injected into the engine through the fuel injection valve 16.

On the other hand, the base advance angle value operating means 6 calculates a base advance angle value by mapping a two-dimensional map which is obtained based on an actual revolution number signal Ne which is obtained on the basis of the reference angle signal SG and a pressure signal Pb. The correction means for stabilizing idling 7 outputs the base advance angle value as a target advance angle value without any correction when the idle switch 4 is in an OFF state at the time of non-idling. The correction means for stabilizing idling 7, when the idle switch 4 is in an ON state at the time of idling, outputs the target advance angle value by correcting the base advance angle value in response to a value of difference between an average revolution number signal Na obtained on the basis of the reference angle signal SG and the actual revolution number signal Ne. The characteristic of the correction means for stabilizing idling 7 is shown in FIG. 7. Namely, when the actual revolution number is less than the average revolution number, a correction angle for stabilizing idling $\Delta\theta$ is shifted to a positive (+) valve, i.e., by correcting the base advance angle value to the advance angle side in an amount corresponding to $\Delta\theta$ to thereby increase the actual revolution number. On the other hand, when the actual revolution number is more than the average revolution number, the base advance value is corrected toward a delayed angle valve in an amount corresponding to $\Delta\theta$ by shifting $\Delta\theta$ to the negative $(-)$ side, whereby the actual revolution number is reduced.

The target advance angle value changing means 8 selects a fixed advance value as a target advance value when it receives a ground potential signal from the ignition timing adjustment signal generator 3 and outputs a signal corresponding to the target advance angle value. On the other hand, the target advance angle value changing means 8 selects an advance angle value which is provided from the correction means for stabilizing idling 7 as the target advance angle value when it does not receive the ground potential signal, and outputs a signal corresponding thereto.

The advance angle value-time converting means 9 obtains a period $T_1$ corresponding to a crank angle of 180° from the reference angle signal SG, and converts the target advance angle value $\theta_{ADV}$ selected by the target advance angle value changing means 8 into a time $T_a$.

The ignition signal output means 10 receives a signal indicating the time $T_a$ and changes the output having an H level to an output having an L level when the time $T_a$ has passed from the rising of the reference angle signal SG, outputting the ignition signal IGT of L level to the ignition device 11. Thus, the ignition device 11 fires a gas mixture in the combustion chamber of the engine.

The reference angle signal SG and the ignition signal IGT are generated at the timings shown in FIG. 8. Namely, when the target advance angle value $\theta_{ADV}$ is expressed by an angle of BTDC, the target advance angle value $\Delta_{ADV}$ can be converted into $T_a$ by using the equation of $$T_a = \frac{(75^\circ - \theta_{ADV})}{180^\circ} \times T_1$$

In the conventional control apparatus for engine an having the construction as described above, when the ignition timing adjustment signal generator 3 generates a ground potential signal, namely, when the generator 3 is turned on, a fixed advance angle value is selected. In the case where the engine is idling, correction for stabilizing idling becomes null, whereby control to a change of revolution number is lost.

Since the feed-back control of the air-fuel ratio is conducted at the above-mentioned time, the air-fuel ratio can be converged to a point near a stoichiometric air-fuel ratio, but fluctuation in revolution number becomes large. Generally, when a timing light is irradiated to the crank shaft at the time of adjusting ignition timing, the scale of the crank shaft apparently stops, which enables the adjustment of the position of the reference angle sensor 1. However, when the fluctuation of the revolution number takes place at that moment, the scale of the crank shaft does not apparently stop, but it turns. Further, in a case of using a period estimation type ignition timing control system, it is difficult to estimate the period, and the timing of the ignition fluctuates, whereby it is difficult to adjust the ignition timing.

Further, there has been known a control apparatus for an engine as shown in FIG. 13. The conventional apparatus is the same as the apparatus as shown in FIG. 12 except that the later excludes the $O_2$ sensor 5 and the feed-back correction means 13. Accordingly, the same reference numerals designate the same or corresponding parts and description of these parts is omitted.

The operation of the conventional apparatus shown in FIG. 13 will be described.

The reference angle sensor 1 which detects the crank angle position of the engine generates a reference angle signal SG which rises at a crank angle of BTDC 75° and falls at a crank angle of BTDC 5°. The base fuel quantity operating means 12 calculates a base fuel quantity by mapping a two-dimensional map on the basis of an actual revolution number signal Ne representing an actual revolution number of the engine which is obtained on the basis of the reference angle signal SG, and a pressure signal Pb which represents an inner pressure of the intake air pipe which is detected by the intake air pipe pressure sensor 2. The fuel injection signal output means 15 converts the base fuel quantity into a time for driving a fuel injection valve and outputs a fuel injection signal having a time width for driving the injection valve in synchronism with the rising of the reference angle signal SG, by which the fuel injection valve 16 is actuated. Thus, the engine is supplied with fuel by the fuel injection valve 16.

The operations concerning the reference advance angle value operating means 6 through the ignition device 16 are the same as those of the apparatus as shown in FIG. 12 for which description has been made with reference to FIGS. 5 and 8, and therefore, description of these structural elements is omitted.

In the conventional control apparatus having the construction described above, since the advance angle value is fixed when the ignition timing adjustment signal generator 3 is turned on, an in particular, since correction for stabilizing idling becomes null when idling operations are effected, control against the fluctuation of revolution number in the engine is lost. In particular, since the base fuel quantity calculated by the base fuel quantity operating means 12 is such as to provide a stoichiometric air-fuel ratio (A/F = 14.7), it is not easy for the gas mixture to be stably burned. Therefore, fluctuation of the revolution number in the engine tends to be large. In a case that such period estimation type ignition timing control system is used, the estimation of the period becomes difficult when the fluctuation of the revolution number is large. When the actual ignition timing fluctuates, the adjustment of ignition timing becomes difficult.

SUMMARY OF THE INVENTION

It is an object of the present invention to provide a control apparatus for an engine capable of reducing the fluctuation of the revolution number of the engine at the time of adjusting ignition timing.

In accordance with the present invention, there is provided a control apparatus for an engine comprising an air-fuel ratio sensor for detecting an air-fuel ratio on the basis of an exhaust gas component from the engine, a fuel control means which receives an output from the air-fuel ratio sensor so as to feed-back-control a fuel quantity in response to the operating conditions of the engine so that the air-fuel ratio becomes the optimum ratio, a fuel supplying means to supply fuel on the basis of a signal from the fuel control means, and a target advance angle value changing means which selects a fixed advance angle value for ignition timing independent from the operating conditions of the engine when an instruction signal for adjusting ignition timing is generated from an ignition timing adjustment signal generator, an ignition means which effects ignition in accordance with an output from the target advance angle value changing means, and a feed-back control stopping means which stops the feed-back control of the air-fuel ratio when the instruction signal is generated from the ignition timing adjustment signal generator.

Further, in accordance with the present invention, there is provided a control apparatus for an engine comprising a fuel control means which controls a fuel quantity in response to the operating conditions of an engine, a fuel supplying means to supply fuel on the basis of a signal from the fuel control means, an ignition timing adjustment signal generator, a target advance angle value changing means which selects a fixed advance angle value for ignition timing independent from the operating conditions of the engine when an instruction signal for adjusting the ignition timing is generated from the ignition timing adjustment signal generator, an ignition means which effects ignition in accordance with an output from the target advance angle value changing means, and means for increasing the fuel quantity when the instruction signal for adjusting the ignition timing is generated from the ignition timing adjustment signal generator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
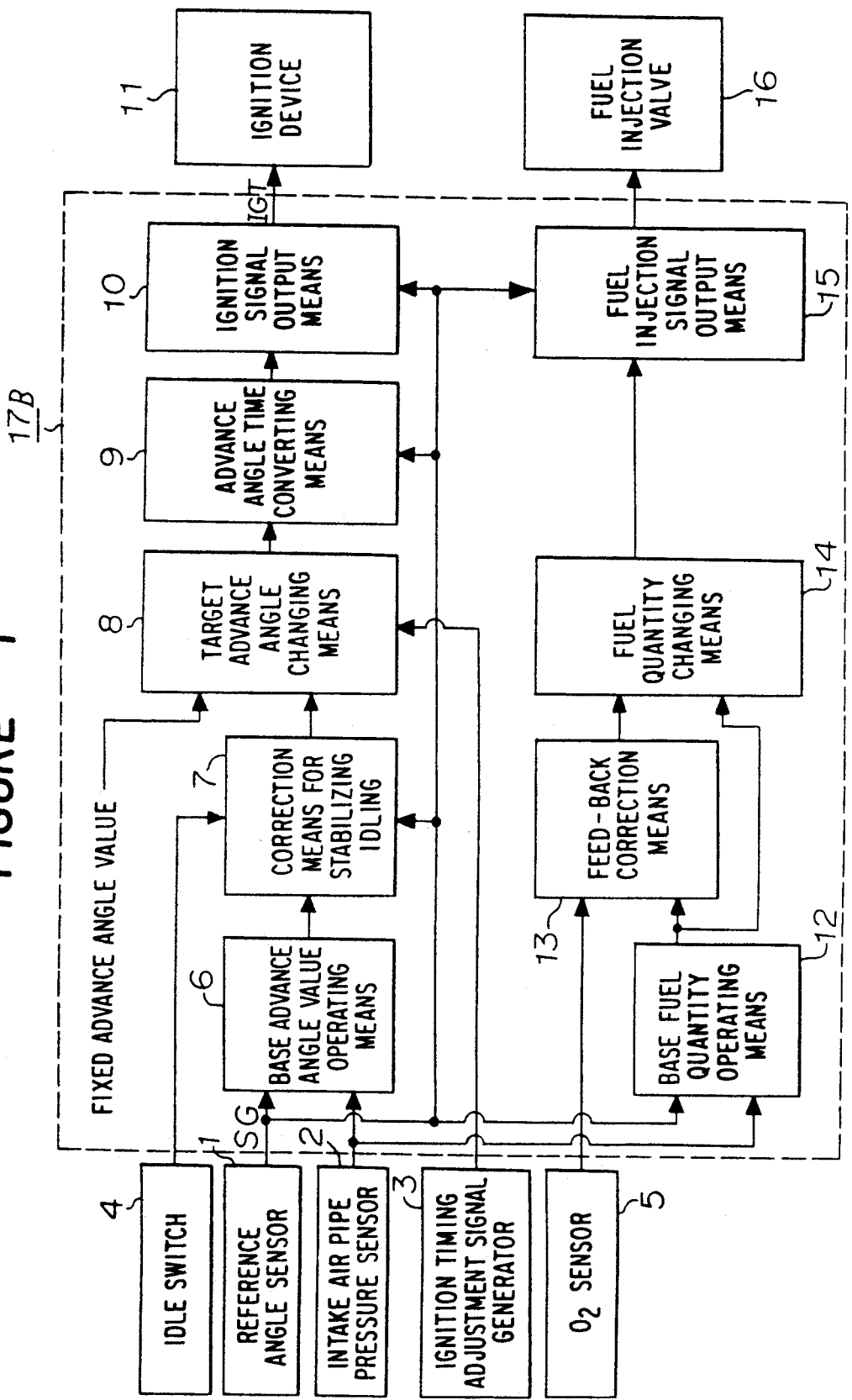
FIG. 1 is a block diagram showing a construction in accordance with an embodiment of the control apparatus for an engine of the present invention.
Figure 12:
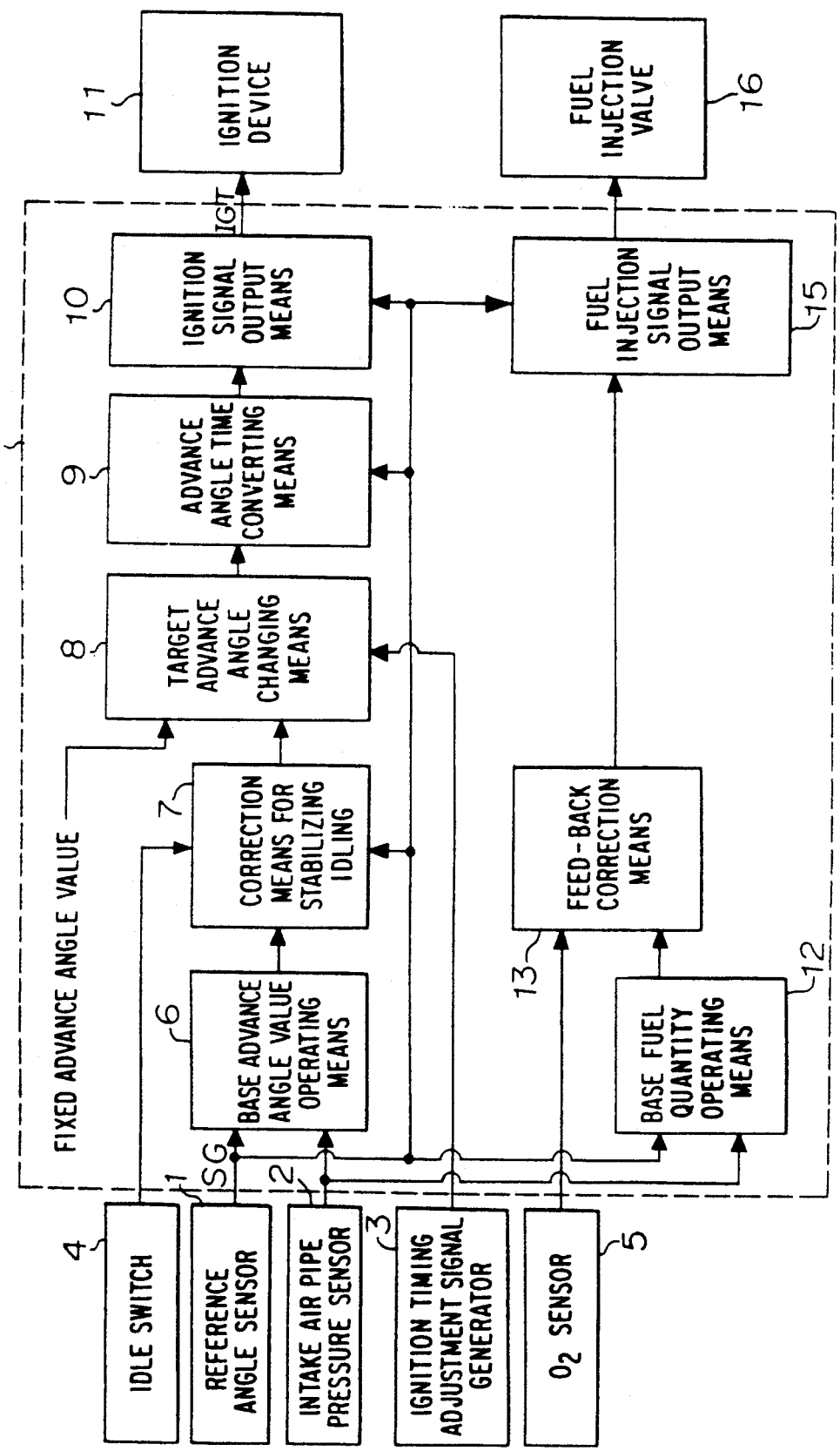
FIG. 12 is a block diagram showing a construction of a conventional control apparatus for an engine.

Referring to the drawings wherein the same reference numerals designate the same or corresponding parts throughout the several views, and more particularly to FIG. 1 thereof, there is shown a block diagram of a typical example of the control apparatus for an engine according to the present invention. In FIG. 1, description with respect to the structural elements 1-13, 15 and 16 is omitted because these elements are same as those as in FIG. 12. A numeral 14 designates a fuel quantity changing means which receives a signal corresponding to a base fuel quantity outputted from a base fuel quantity operating means 12 and a signal corresponding to a fuel quantity which is subjected to feed-back-correction, outputted from a feed-back correction means 13, and selects either of the inputted signals in response to a signal from the ignition timing adjustment signal generator 3, the selected signal being outputted to the fuel injection signal output means 15. A numeral 17B designates an electronic control unit which is constituted by structural elements 6-10 and 12-15 and outputs an ignition signal IGT and a fuel injection signal.

The operation of the control apparatus according to the above-mentioned embodiment will be described. Description concerning the same operations as already described with reference to the conventional technique is omitted and only featurized portions will be described.

The fuel quantity changing means 14 selects the base fuel quantity signal from the base fuel quantity operating means 12 when a ground potential signal is inputted from the ignition timing adjustment signal generator 3 at the time of adjusting the timing of ignition, and outputs the base fuel quantity signal. On the other hand, when the fuel quantity changing means 14 selects the fuel quantity signal of the feed-back correction means 13 when a non ground potential signal is inputted from the ignition timing adjustment signal generator 3 at the time of non-adjusting the timing of ignition and outputs the fuel quantity signal. The fuel injection signal output means 15 receives the selected signal, converts the input signal into a fuel injection signal having a time width which corresponds to a time for driving a fuel injection valve, and outputs the same.

Figure 2:
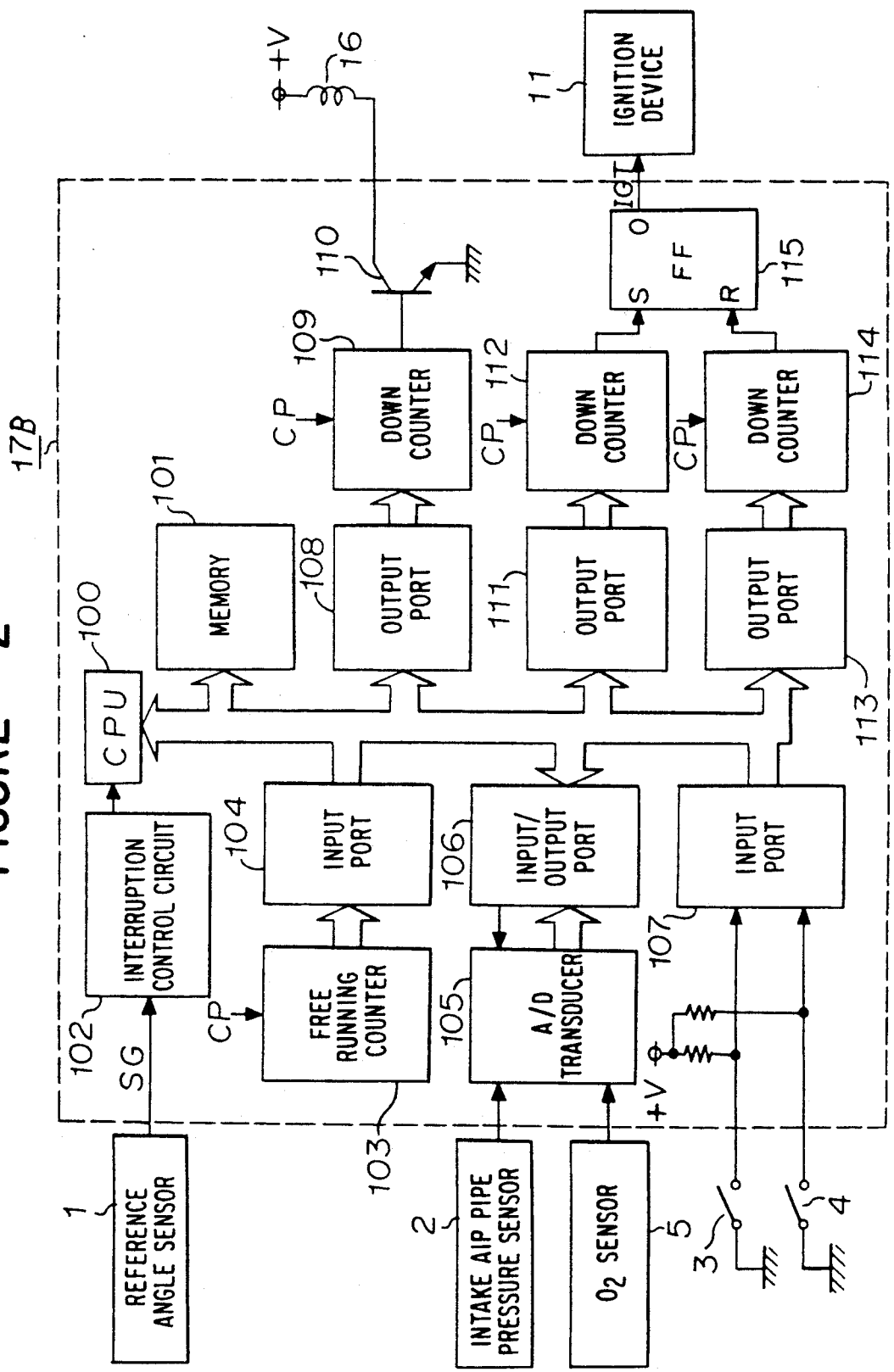
FIG. 2 is a diagram showing a concrete structural arrangement of the apparatus as shown in FIG. 1.

FIG. 2 is a diagram showing the detailed construction of the electronic control unit 17B and peripheral elements shown in FIG. 1.

Figure 3:
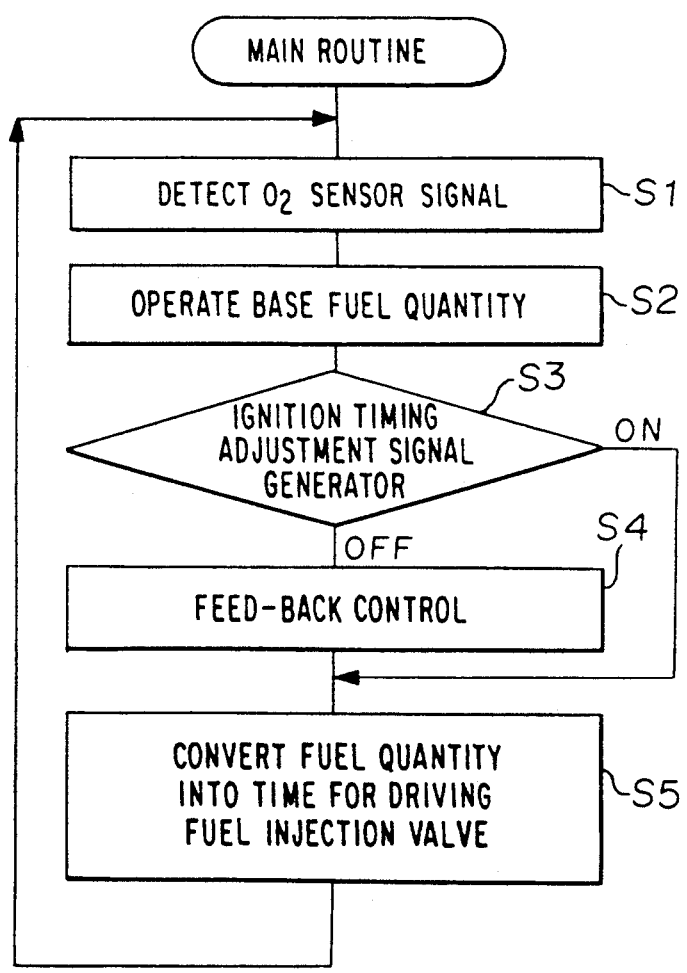
FIG. 3 is a flow chart showing the main routine executed by the apparatus of the embodiment according to the present invention.
Figure 4:
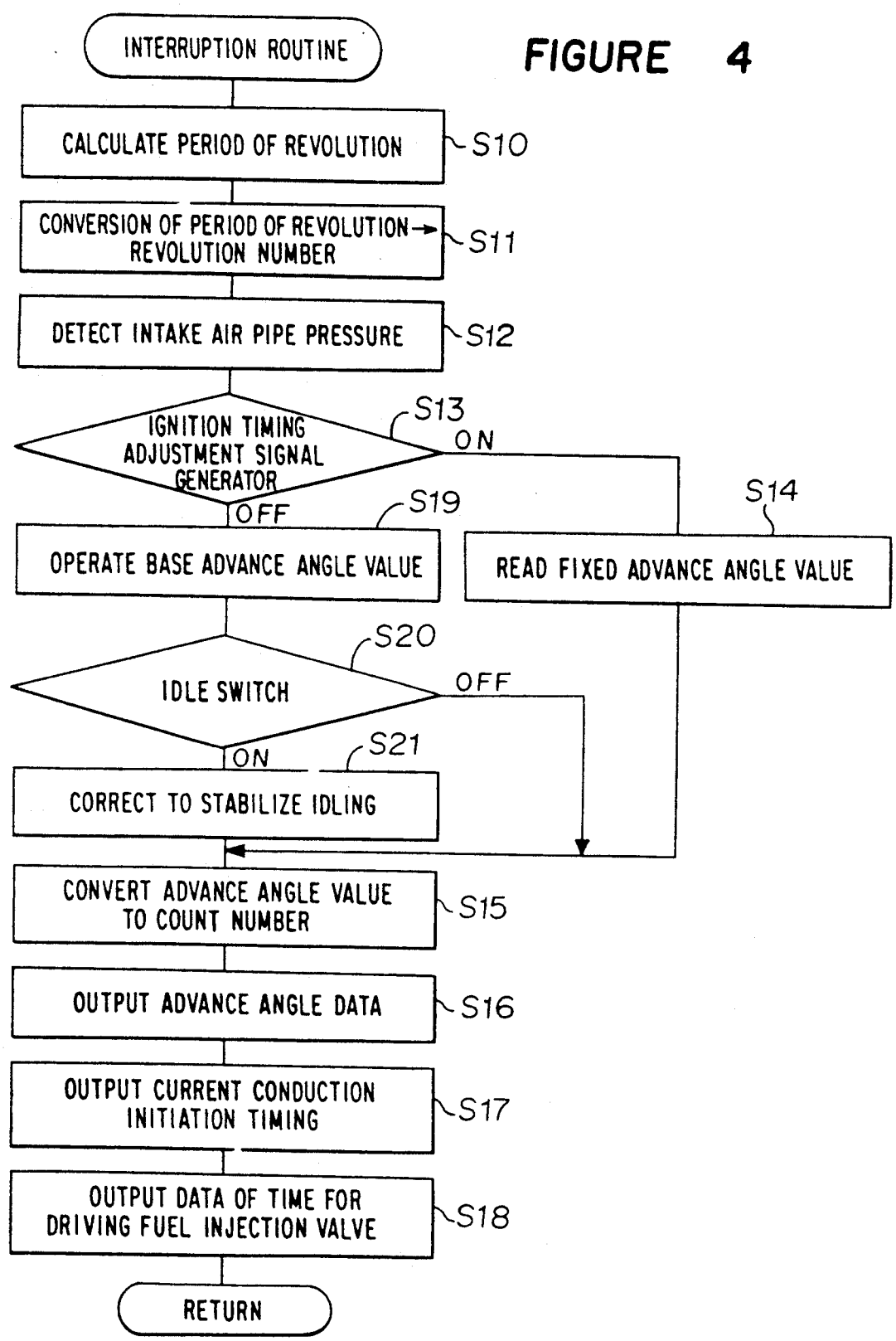
FIG. 4 is a flow chart showing an interruption routine.
Figure 5:
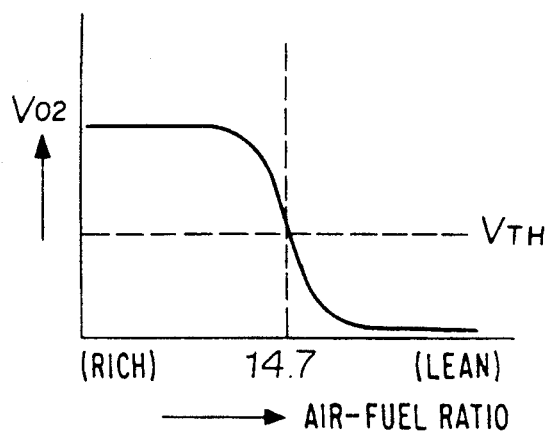
FIG. 5 is a characteristic diagram of an $O_2$ sensor.
Figure 6:
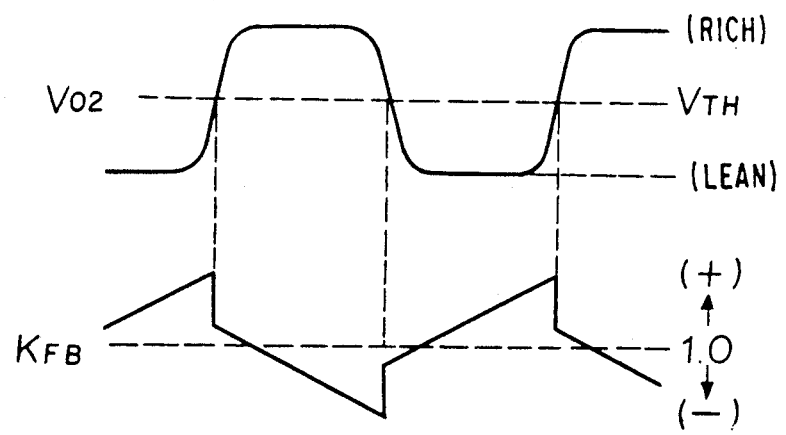
FIG. 6 is a signal waveform diagram showing the timing of an output voltage $V_{O2}$ from the $O_2$ sensor and a proportion-grated value.

A CPU 100 processes various kinds of data by utilizing a memory 101 which stores operating flows in a form of program which are shown in FIGS. 3 and 4. A reference angle signal SG from the reference angle sensor 1 is inputted to an interruption control circuit 102, and transferred to the CPU 100 as an interruption command signal which is in synchronism with the rising edges (BTDC 75°). A free running counter 103 counts clock pulses CP. When the interruption command signal is generated, the counted value is read by the CPU 100 through an input port 104. A period of revolution and an actual revolution number of the engine are calculated in the CPU 100. Analogue detection signals from an intake air pipe pressure sensor 2 and an $O_2$ sensor 5 are inputted into an A/D transducer 105 having a multiplexing function where the detection signals are converted into digital signals to be outputted to an input/output port 106.

The ignition timing adjustment signal generator 3 and an idle switch 4 are normally in an OFF state whereby a signal having an H level is inputted to an input/output port 107. When the ignition timing is adjusted or the engine is idling, the ignition timing adjustment signal generator 3 and the idle switch 4 are in an ON state, whereby a ground potential signal is inputted to the input/output port 107.

A time for driving the fuel injection valve is set in synchronism with the interruption command signal in a down counter 109, a signal indicating the driving time being supplied from the CPU 100 through an output port 108. The down counter 109 receives clock pulses CP to start countdown and renders a transistor 110 ON by supplying a base current to the transistor 110 until the count becomes 0. When the transistor 110 is in an ON state, a current is supplied to a fuel injection valve 16 so that the valve 16 is opened.

The CPU 100 obtains calculating method data of current conduction initiating time for ignition coils in the ignition device 11 by utilizing the data of ignition timing according to a known method, and the data of current conduction initiating time is set in a down counter 112 through an output port 111. The down counter 112 counts down in accordance with the clock pulses CP. When a value to be counted becomes 0, an RS flip-flop 115 is set so that an H level signal is outputted through the Q output terminal, whereby a current is supplied to an ignition coil in the ignition device 11.

A time $T_a$ for producing the ignition signal IGT is set in a down counter 114 from the CPU 100 through an output port 113 in synchronism with the interruption command signal. When a value to be counted becomes 0 on the expiring of the time $T_a$ after the down counter 114 has been set, the RS flip-flop 115 is reset, whereby the potential at the Q output terminal of the RS flip-flop 115 is changed from an H level to an L level to thereby interrupt the current to the ignition coil.

The operation of the CPU 100 will be described with reference to FIGS. 2 through 4.

The operations according to the main routine as shown in FIG. 3 are executed. At step S1, the output voltage $V_{O2}$ of the $O_2$ sensor 5 is converted into a digital signal to be read. At step S2, a base fuel quantity is calculated by mapping the signal indicating an actual revolution number Ne which has already been obtained and the pressure signal Pb which has also been read. At step S3, a determination is made whether the ignition timing adjustment signal generator 3 is ON or OFF. When it is ON, an operating step goes to step S5 without correcting the base fuel quantity by feed-back control. When it is OFF, a feed-back correction coefficient $K_{FB}$ is calculated on the basis of a value converted into a digital form of $V_{O2}$, and a corrected fuel quantity is calculated by multiplying the base fuel quantity by $K_{FB}$ at step S4. Then, step S5 is taken. At step S5, the fuel quantity obtained at step S2 or step S4 is converted into a time for driving the fuel injection valve. After the operation of step S5 has been finished, the operating step is returned to step S1 and the above-mentioned operations are repeated.

When the interruption command signal is generated at the rising edge (BTDC 75°) of the reference angle signal SG which is outputted from the reference angle sensor 1, the interruption routine (FIG. 4) is executed.

At step S10, a value in the free running counter 103 is read, and a period of revolution is calculated by taking a difference between the value read and a previously counted value. At step,S11, the calculated period of revolution is converted into an actual revolution number signal Ne. At step S12, a pressure signal Pb obtained by the A/D conversion of the output signal of the intake air pipe pressure sensor 2 is read. At step S13, a determination is made whether the ignition timing adjustment signal generator 3 is ON or OFF. When it is ON, a fixed advance angle value is read from the memory 101 at step S14. On the other hand, when it is OFF, step S19 is taken. At step S15, the advance angle value is converted into a count down number in the down counter 114. The count number corresponds to the time $T_a$. At step S16, the count number corresponding to the time $T_a$ is set in the down counter 114. At step S17, information of current conduction initiating timing is set at the down counter 112. At step S18, information of fuel injection valve driving time is set at the down counter 109. Then, the operating step is returned to the main routine.

Figure 7:
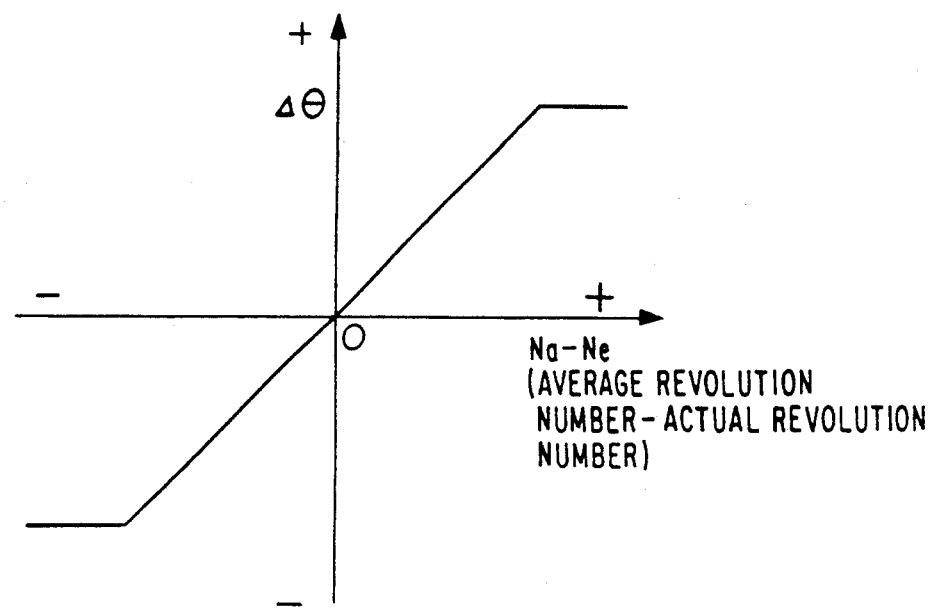
FIG. 7 is a characteristic diagram of a correction means for stabilizing idling.
Figure 8:
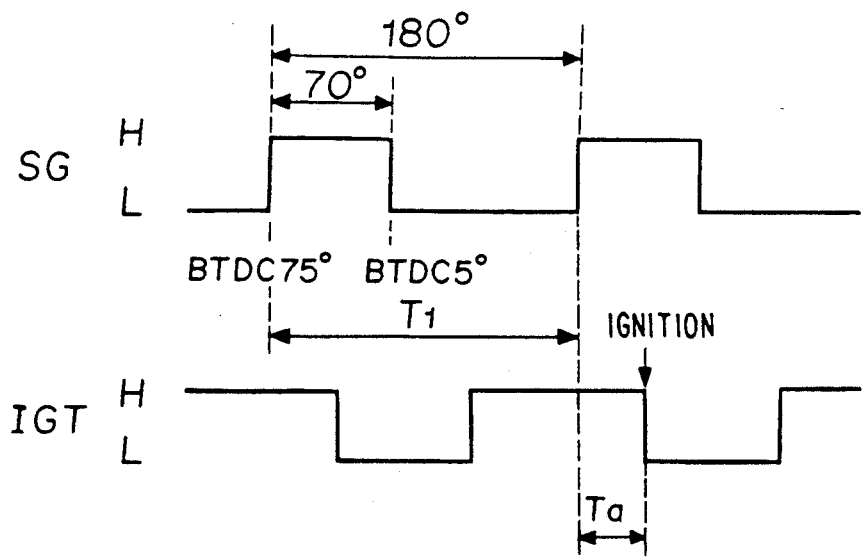
FIG. 8 is a signal waveform diagram showing the timing of a reference angle signal SG and an ignition signal IGT.

On the other hand, at step S19, a base advance angle value is calculated by mapping the actual revolution number signal Ne and the pressure signal Pb. At step S20, a determination is made whether the idle switch 4 is ON or OFF. When it is OFF, the operating step goes to step S15. On the other hand, when it is ON, the operation of the correction for stabilizing idling, which has been explained with reference to FIG. 7, is executed at step S21, and then, step S15 is taken. The operating step of step S15 and the following steps are the same as those previously described.

Thus, in accordance with the embodiment as above-mentioned, an advance angle value for ignition timing is fixed at the time of adjusting the ignition timing and feed-back control for an air-fuel ratio is stopped, whereby fluctuations of the revolution number in the engine can be reduced; the actual advance angle value becomes stable, and the adjustment of the ignition timing can be easy.

A second embodiment of the control apparatus for an engine of the present invention will be described with reference to the drawings.

Figure 9:
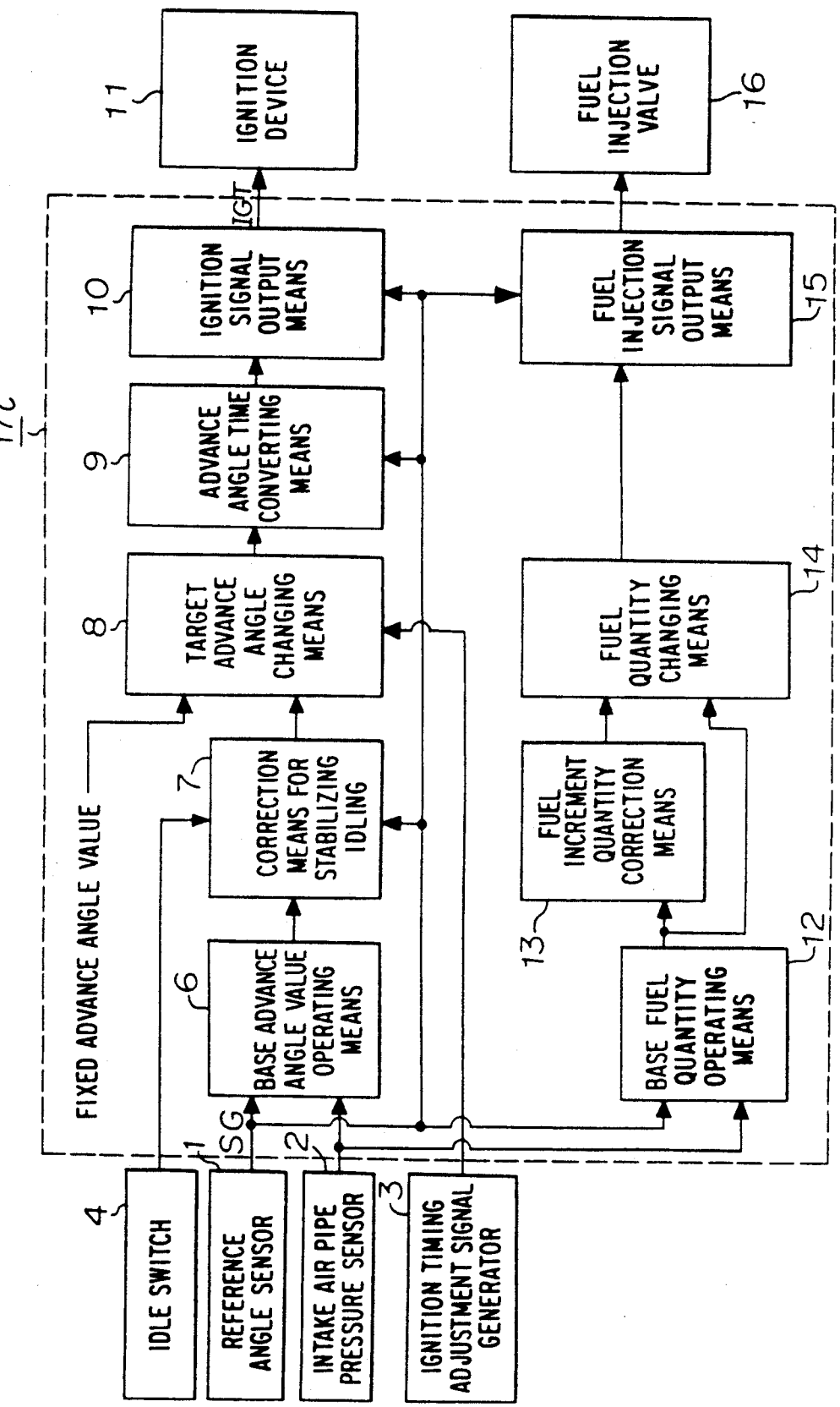
FIG. 9 is a block diagram showing a construction of another embodiment of the control apparatus for an engine according to the present invention.
Figure 13:
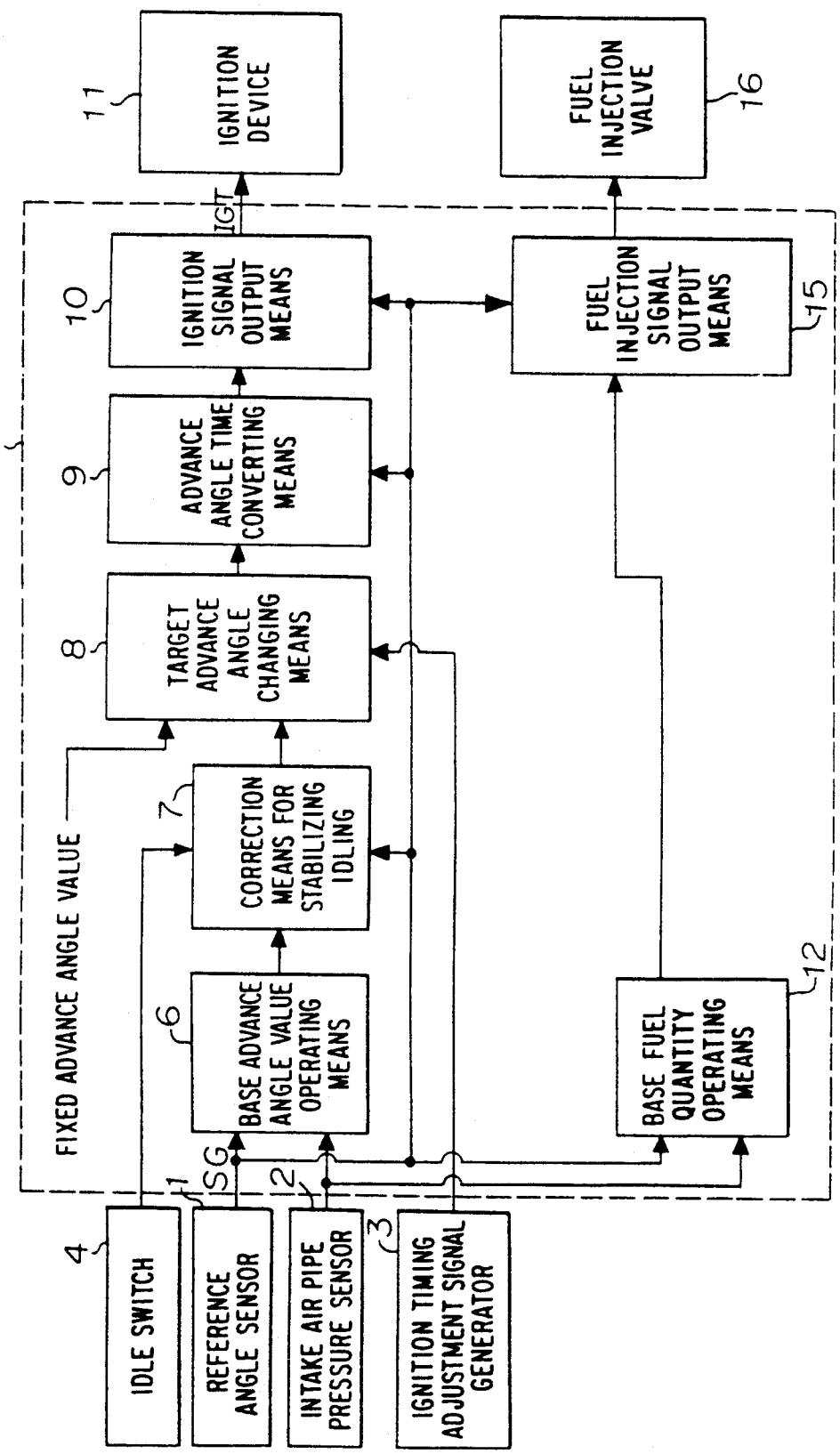
FIG. 13 is a block diagram showing a construction of another conventional control apparatus for an engine.

FIG. 9 is a block diagram of the second embodiment of the control apparatus. In FIG. 9, the same reference numerals as in FIG. 13 designate the same or corresponding parts, and description of these parts is omitted.

A reference numeral 13 designates a fuel increment quantity correction means which corrects to increase a base fuel quantity calculated by the base fuel quantity operating means 12. A numeral 14 designates a fuel quantity changing means which selects either a base fuel quantity signal outputted from the base fuel quantity operating means 12 in response to a signal from the ignition timing adjustment signal generator 3 or a fuel quantity signal outputted from the fuel increment quantity correction means 13, and outputs the selected signal to the fuel injection signal output means 15. A numeral 17C designates an electronic control unit which is constituted by structural elements 6–10 and 12–15 and which outputs an ignition signal IGT and a fuel injection signal.

The operation of the control apparatus of the second embodiment will be described concerning only the featurized portion.

The fuel increment quantity correction means 13 corrects a fuel quantity to be increased by multiplying the base fuel quantity calculated by the base fuel quantity operating means 12 by a coefficient which is, for instance, greater than 1.0. The fuel quantity corrected to be increased is such that the air-fuel ratio assumes a value of 12.5–13. A gas mixture including fuel in an amount corresponding to the air-fuel ratio gives a stable combustion in the combustion chamber of the engine.

The fuel quantity changing means 14 selects the fuel quantity signal of the fuel increment quantity correction means 13 when a ground potential signal is received from the ignition timing adjustment signal generator 3 at the time of adjusting the ignition timing, and outputs the selected fuel quantity signal. On the other hand, the fuel quantity changing means 14 selects the base fuel quantity signal of the base fuel quantity operating means 12 when a non-ground potential signal is received from the ignition timing adjustment signal generator 3 at the non-adjusting time of the ignition timing, and outputs the selected base fuel quantity signal. The fuel injection signal output means 15 receives the selected signal; converts the fuel quantity corresponding to the input signal into a time for driving the fuel injection valve, and outputs a fuel injection signal having a time width corresponding to the driving time to a fuel injection valve 16.

Figure 10:
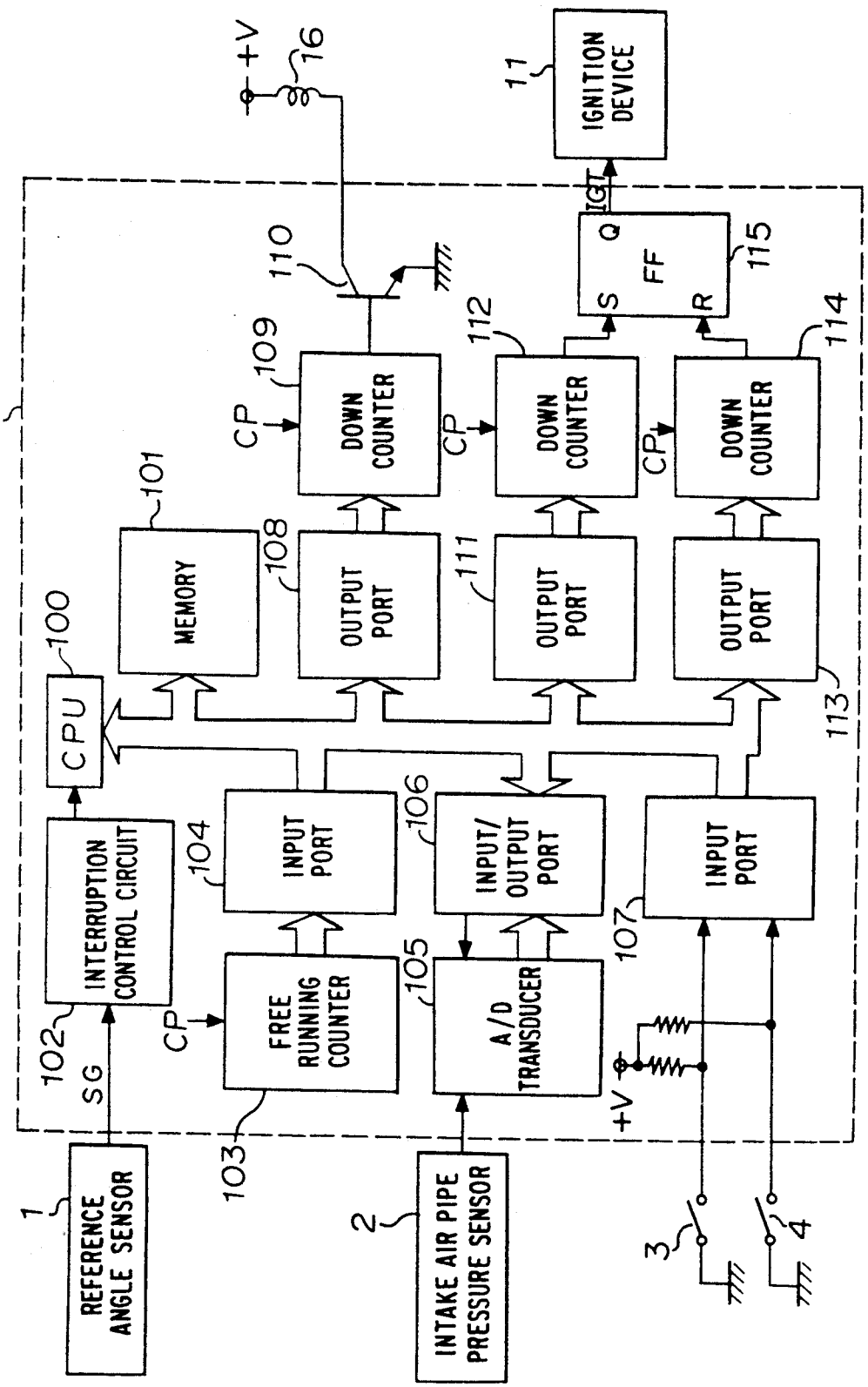
FIG. 10 is a diagram showing a concrete structural arrangement of the apparatus as shown in FIG. 9.

FIG. 10 is a diagram showing the electronic control unit 17C and circumferential elements as in FIG. 9.

Figure 11:
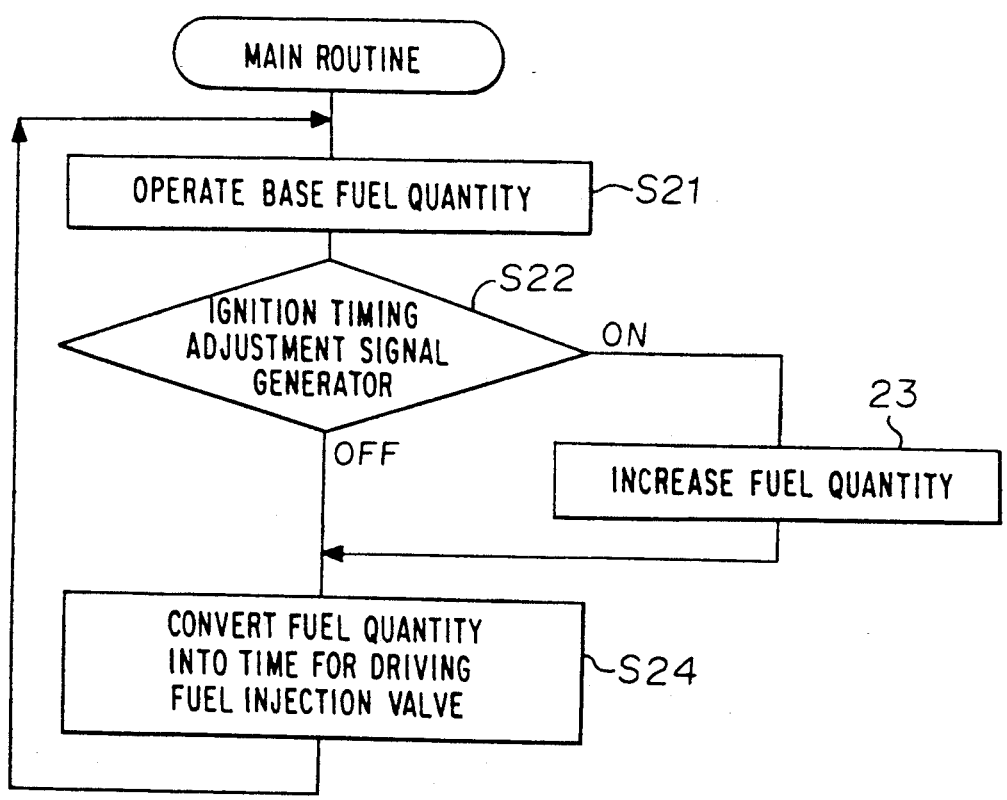
FIG. 11 is a flow chart showing the main routine executed by the apparatus as shown in FIG. 9.

The electronic control unit 17C comprises a CPU 100 which processes various kinds of data by utilizing a memory 101 which stores operating flows as programs which are shown in FIGS. 4 and 11. A reference angle signal SG from a reference angle sensor 1 is received in an interruption control circuit 102, and the signal is transformed in an interruption command signal synchronized with the rising edges (BTDC 75°), the command signal being supplied to the CPU 100. A free running counter 103 counts clock pulses CP. When the interruption command signal is generated, a value counted by the counter 103 is read by the CPU 100 through an input port 104, whereby a period of revolution and an actual revolution number of the engine are calculated in the CPU 100. An analogue detection signal from an intake air pipe pressure sensor 2 is inputted to an A/D transducer 105 where it is transformed into a digital signal which is inputted into an input/output port 106.

An ignition timing adjustment signal generator 3 and an idle switch 4 are usually in an OFF state and they produce H level signals. When ignition timing is adjusted or the engine is in an idling operation, they are turned on, and ground potential signals are respectively inputted to an input port 107. A signal indicating a time for driving the fuel injection valve is supplied from the CPU 100 through an output port 108 to a down counter 109 by which the time for driving fuel injection valve is set at the down counter 109 in synchronism with the interruption command signal. The down counter 109 receives the clock pulses CP and maintains a transistor 110 ON by supplying a base current to the transistor 110 until a value to be counted becomes 0. When the transistor 110 is in an ON state, a fuel injection valve 16 is supplied with a current so that it is actuated.

The CPU 100 obtains by a known calculating method information of current conduction initiating time for an ignition coil in an ignition device 11 from data of ignition timing. The obtained current conduction initiation timing is set in a down counter 112 through an output port 111. The down counter 112 counts down the clock pulses CP until the value to be counted becomes 0. When the value becomes 0, an RS flip-flop 115 is set so that an H level signal is generated from the Q output terminal. The H level signal is supplied to the ignition coil of the ignition device 11. A time $T_a$ to produce an ignition signal IGT is set in a down counter 114 through an output port 113 in synchronism with the generation of the interruption command signal. The down counter 114 resets the RS flip-flop 115 when the value becomes 0 at the lapse of the time $T_a$ after the down counter 114 has been set. Accordingly, the potential at the Q output terminal of the RS flip-flop 115 is changed from an H level to an L level, whereby current to the primary side of the ignition coil is interrupted.

The operation of the CPU 100 will be described with reference to FIGS. 4 and 10.

The main routine as shown in FIG. 11 is executed.

At step S21, a base fuel quantity is calculated by mapping the signal indicating the actual revolution number Ne which has already been obtained and the pressure signal Pb which has also been read. At step S22, a determination is made whether the ignition timing adjustment signal generator 3 is ON or OFF. When it is OFF, the operating step goes to step S24 without any correction of increasing the base fuel quantity. On the other hand, when it is ON, the fuel quantity is calculated so as to increase the quantity by multiplying the base fuel quantity by a predetermined coefficient which is greater than 1.0, at step S23. Then, the operating step goes to S24. At step S24, the fuel quantity obtained at step S21 or step S23 is converted into a time for driving the fuel injection valve. After the operation of step S24 has been finished, the operating step is returned to step S21, and the above-mentioned operations are repeated.

The interruption routine as shown in FIG. 4 is executed when the interruption command signal is generated at the rising edge (BTDC 75°) of the reference angle signal SG outputted from the reference angle sensor 1. The description concerning the interruption routine is omitted since the interruption routine is the same as described with reference to the first example.

Thus, in accordance with the second embodiment of the present invention, an advance angle value for ignition timing is fixed at the time of adjusting the ignition timing and the fuel quantity is corrected so as to increase it. Accordingly, a stable combustion in the engine is obtained, and accordingly fluctuations of the revolution can be reduced, the actual advance angle value becomes stable, and the adjustment of ignition timing becomes easy.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus for an engine which comprises a fuel control means which controls a fuel quantity in response to the operating conditions of an engine, a fuel supplying means to supply fuel on the basis of a signal from the fuel control means, an ignition timing adjustment signal generator, a target advance angle value changing means which selects a fixed advance angle value for ignition timing independent from the operating conditions of the engine when an instruction signal for adjusting the ignition timing is generated from the ignition timing adjustment signal generator, an ignition means which effects ignition in accordance with an output from the target advance angle value changing means and means for increasing the fuel quantity when the instruction signal for adjusting the ignition timing is generated from the ignition timing adjustment signal generator.

* * * * *